(12) United States Patent
Li et al.

(10) Patent No.: US 12,103,186 B2
(45) Date of Patent: Oct. 1, 2024

(54) METHOD OF CONTROLLING MOVEMENT OF A MOBILE ROBOT IN THE EVENT OF A LOCALIZATION FAILURE

(71) Applicant: Hong Kong Applied Science And Technology Research Institute Co., Ltd., Shatin (HK)

(72) Inventors: Zhao Li, Tai Wai (HK); Wei Han, Tai Po (HK); Yue Sun, Shatin (HK)

(73) Assignee: Hong Kong Applied Science And Technology Research Institute Co., Ltd, Shatin (HK)

( * ) Notice: Subject to any disclaimer, the term of this patent is extended or adjusted under 35 U.S.C. 154(b) by 286 days.

(21) Appl. No.: 17/853,388

(22) Filed: Jun. 29, 2022

(65) Prior Publication Data

US 2024/0001550 A1    Jan. 4, 2024

(51) Int. Cl.
*B25J 9/16* (2006.01)
(52) U.S. Cl.
CPC .............. *B25J 9/1664* (2013.01); *B25J 9/162* (2013.01); *B25J 9/1653* (2013.01); *B25J 9/1674* (2013.01); *B25J 9/1697* (2013.01)
(58) Field of Classification Search
CPC ........ B25J 9/1664; B25J 9/162; B25J 9/1653; B25J 9/1674; B25J 9/1697; G06T 2207/10016; G06T 2207/10024; G06T 7/11; G06T 7/70; G01C 21/00; G05D 1/246; G05D 1/857; G05D 2107/63; G05D 2109/10; G05D 2111/10; G05D 1/243
See application file for complete search history.

(56) References Cited

U.S. PATENT DOCUMENTS

| | | | |
|---|---|---|---|
| 9,984,467 B2 | 5/2018 | Chandrasekar et al. | |
| 10,068,336 B1 | 9/2018 | Zhang et al. | |
| 10,303,980 B1 * | 5/2019 | Kim ..................... | G06F 18/217 |
| 10,929,713 B2 | 2/2021 | Chiu et al. | |
| 10,984,545 B2 | 4/2021 | Gu et al. | |

(Continued)

FOREIGN PATENT DOCUMENTS

| | | |
|---|---|---|
| CN | 108387917 A | 8/2018 |
| CN | 109186606 A | 1/2019 |

(Continued)

OTHER PUBLICATIONS

Dorin Comaniciu and Peter Meer, Mean Shift: A Robust Approach Toward Feature Space Analysis, IEEE Transactions on Pattern Analysis and Machine Intelligence, May 2002, pp. 603-619, vol. 24 No. 5.

(Continued)

*Primary Examiner* — Abby Y Lin
*Assistant Examiner* — Dylan M Katz
(74) *Attorney, Agent, or Firm* — GableGotwals

(57) ABSTRACT

Described is a method of controlling movement of a mobile robot in the event of a localization failure. The method comprises, on an occurrence of the localization failure, receiving an image from an image sensor of the mobile robot. The method includes splitting received image into at least two vertical portions and determining if one of said at least two vertical portions is indicative of a passable path. The method includes controlling the mobile robot to travel along the passable path indicated by a selected one of said at least two vertical portions.

18 Claims, 11 Drawing Sheets

(56) References Cited

U.S. PATENT DOCUMENTS

| | | |
|---|---|---|
| 11,164,394 B2 | 11/2021 | Gausebeck |
| 2016/0232705 A1 | 8/2016 | Ramalingam |
| 2019/0026957 A1 | 1/2019 | Gausebeck |
| 2021/0031367 A1* | 2/2021 | Mirzaei ................. G06V 10/56 |

FOREIGN PATENT DOCUMENTS

| | | | |
|---|---|---|---|
| CN | 106092104 B | 3/2019 | |
| CN | 110307848 A * | 10/2019 | |
| CN | 110622081 A | 12/2019 | |
| CN | 112276933 A | 1/2021 | |
| CN | 112767373 A | 5/2021 | |
| DE | 102019120880 A1 | 2/2020 | |
| WO | WO-2019190395 A1 * | 10/2019 | ............. G01C 21/20 |

OTHER PUBLICATIONS

Andre M. Santana, Kelson R. T. Aires, Rodrigo M. S. Veras, Adelardo A. D. Medeiros, An Approach for 2D Visual Occupancy Grid Map Using Monocular Vision, Electronic Notes in Theoretical Computer Science 281 (2011) 175-191.

Keinosuke Fukunaga and Larry D. Hostetler, The Estimation of the Gradient of a Density Function, with Applications in Pattern Recognition, IEEE Transactions on Information Theory, vol. IT-21, No. 1, Jan. 1975.

* cited by examiner

METHOD OF CONTROLLING MOVEMENT OF A MOBILE ROBOT IN THE EVENT OF A LOCALIZATION FAILURE

FIELD OF THE INVENTION

The invention relates particularly, but not exclusively, to an improved method of controlling movement of a mobile robot in the event of a localization failure and to a mobile robot configured to move along a preferred path in the event of a localization failure.

BACKGROUND OF THE INVENTION

Simultaneous localization and mapping (SLAM) operation is of importance in mobile robotics. It refers to at least the process of incrementally constructing a map of the local, i.e., surrounding, environment from at least robot sensor data whilst maintaining an estimate of the current location/pose of the mobile robot at any point in time. However, SLAM localization failures may occur for a number of reasons. A localization failure is an event where the mobile robot is unable at a point of time and/or for a period of time to determine its current location/pose with respect to a map of the local environment using sensor and/or image data from the mobile robot. SLAM localization failures may occur because of distortions in the map constructed of the local environment possibly caused by outliers of sensor data, incomplete map data, and/or inaccurate map data possibly caused by limitations of the SLAM algorithms. SLAM localization failures may also occur due to the presence of dynamic objects in the environment surrounding the mobile robot. Dynamic objects such as human beings pose one of the greatest challenges to operation of SLAM systems. Yet further SLAM localization failures may occur due to the presence of almost identical repetitive patterns in the local environment map data such as, for example, almost identical cubicles in an office space, and almost identical walls and doors along a corridor, both of which are common in an office environment.

One solution to the problem of SLAM localization failures is to control the mobile robot to stop and spin upon occurrence of a localization failure and to use robot sensor/image data obtained during the spin to re-localize the robot with respect to the map of the local environment. However, using this method to try and recover from a localization failure has a low probability of success because it is being attempted at a location where a localization failure has already occurred. This is especially the case in an office environment with repetitive patterns in the local environment map data. Not only does this solution have a low probability of success, but it significantly slows navigation of the mobile robot through the local environment.

Another solution to the problem of SLAM localization failures is to construct, fully or partially, three-dimensional images from the two-dimensional image data obtained from the mobile robot's camera or image sensor to enable the mobile robot to then travel in a safe direction whilst avoiding obstacles. This is, however, a nontrivial operation computationally typically requiring use of one or more deep neural networks. In addition to expensive computational resources, this solution is also time-consuming requiring training and tuning of the one or more deep neural networks.

Yet another solution to the problem of SLAM localization failures is to employ a heuristic method to try to reconstruct the whole three-dimensional scene surrounding the mobile robot. This typically involves making judgments about the environment surrounding the mobile robot based on a selected number of three-dimensional geometric environmental features extracted from two-dimensional image data. This solution is best adapted to static environments with precise and regular geometric properties. It struggles in environments with dynamic obstacles such as human beings.

CN112767373A discloses a robot indoor complex scene obstacle avoidance method based on a monocular camera. The monocular obstacle avoidance navigation network is composed of an environment perception stage and a control decision stage, and specifically comprises a depth prediction module, a semantic mask module, a depth slicing module, a feature extraction guidance module, a reinforcement learning module and data enhancement. According to the network, a monocular RGB image serves as input, after a semantic depth map is obtained, dynamic minimum pooling operation is conducted to obtain pseudo laser data; then the pseudo laser data serve as state input of reinforcement learning, and a final robot decision action is generated. In this context, an RGB image comprises an image comprising a 3 data array defining "red", "green" and "blue" color components for each image pixel.

CN106092104B discloses a system of indoor robot navigation. If the robot is lost, the system will perform laser repositioning according to laser point cloud data and perform visual repositioning according to visual image data. Based on the relocation results of laser and visual data, the system will determine whether there is a familiar region. When there is no familiar region, the robot is controlled to perform obstacle avoidance movement until it is determined there is a familiar region.

US9,984,467B discloses a vehicle navigation system. When the system determines the vehicle is lost, a subsequent set of images will be captured. Associating the features in images with the features of an industrial facility map creates feature pairs. The vehicle position can be calculated and relocated based on the feature pairs.

Among other things, what is therefore desired is an improved method of controlling movement of a mobile robot in the event of a localization failure and to a mobile robot configured to move along a preferred path in the event of a localization failure.

OBJECTS OF THE INVENTION

An object of the invention is to mitigate or obviate to some degree one or more problems associated with known methods of controlling movement of a mobile robot in the event of a localization failure.

The above object is met by the combination of features of the main claims; the sub-claims disclose further advantageous embodiments of the invention.

Another object of the invention is to provide a mobile robot configured to move along a preferred path in the event of a localization failure.

One skilled in the art will derive from the following description other objects of the invention. Therefore, the foregoing statements of object are not exhaustive and serve merely to illustrate some of the many objects of the present invention.

SUMMARY OF THE INVENTION

The invention concerns a method of recovering from localization failures of a mobile robot, especially an indoor mobile robot. The invention provides a recovery algorithm for mobile robot navigation when said robot is facing intermittent localization failures. The algorithm for mobile robot navigation in the event of localization failures is especially, but not exclusively, intended for a mobile robot having a monovision SLAM system. A monovision SLAM algorithm is an algorithm for a mobile robot having a SLAM system and a monovision or monocular camera or image sensor. A monovision SLAM system may be referred to as a visual SLAM system comprising one or a set of algorithms that use camera observations such as images as the main source of data for localization determination and mapping. A visual SLAM system is typically operated in two phases, namely: (i) a mapping phase in which a map of the local environment is constructed from real-time camera images whilst the mobile robot is moving around the local environment; and (ii) a localization phase comprising the mobile robot determining its current location, i.e., localization, in the local environment by comparing a last taken or latest image from the camera to the map constructed in the mapping phase.

In a first main aspect, the invention provides a method of controlling movement of a mobile robot in the event of a localization failure. The method comprises, on an occurrence of the localization failure, receiving an image from an image sensor of the mobile robot. The method includes splitting the received image into at least two vertical portions and determining if one of at least two vertical portions is indicative of a passable path. The method includes controlling the mobile robot to travel along the passable path indicated by a selected one of said at least two vertical portions.

One advantage conveyed by the invention is the recognition that a mobile robot has an increased probability of recovering from a localization failure if it is controlled to continue moving in a forward direction with respect to its previous direction of travel.

Another advantage is that the method of the invention does not require expensive computational resources.

In a second main aspect, the invention provides a mobile robot comprising a memory storing machine-readable instructions and a controller for executing the machine-readable instructions such that, when the controller executes the machine-readable instructions, it configures the mobile robot to implement the steps of the first main aspect of the invention.

In a third main aspect, the invention provides a non-transitory computer readable medium storing machine-readable instructions which, when executed by a processor, cause a mobile robot to implement the steps of the first main aspect of the invention.

The summary of the invention does not necessarily disclose all the features essential for defining the invention; the invention may reside in a sub-combination of the disclosed features.

The forgoing has outlined broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
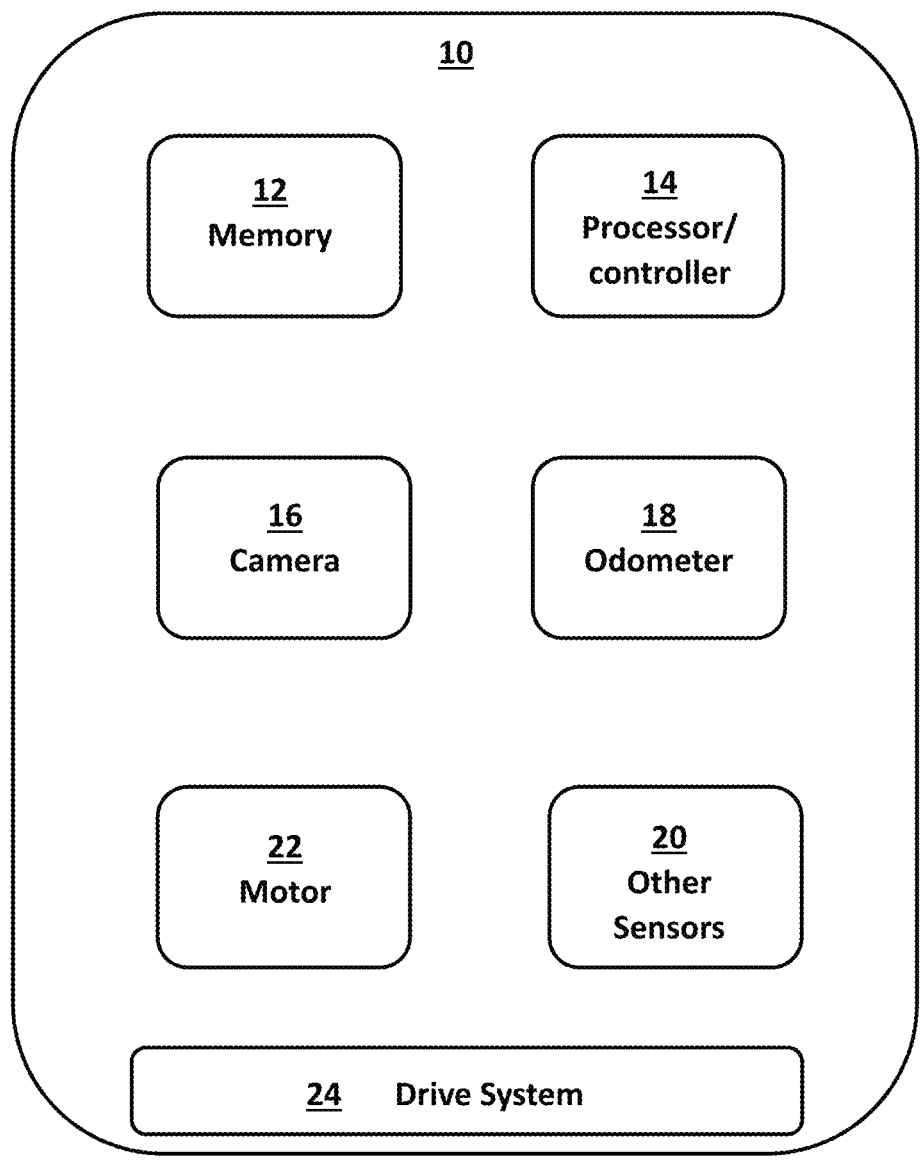
FIG. 1 is a schematic block diagram of a mobile robot in accordance with the invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided using dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

FIG. 1 comprises a schematic block diagram of the components comprising an embodiment of a mobile robot 10 in accordance with the invention. The mobile robot 10 has a memory 12 for storing one or more control algorithms, the one or more control algorithms comprising machine-readable instructions. The one or more control algorithms preferably comprise one or more SLAM algorithms. The mobile robot 10 has a processor/controller 14 which executes the machine-readable instructions to control the mobile robot 10 in accordance with the invention. The mobile robot 10 has at least one image sensor or camera 16. In preferred embodiments, the mobile robot 10 has a single monovision camera 16. An odometer 18 is provided to provide distance data indicative of how far the mobile robot 10 has moved from, for example, a starting location. The mobile robot 10 may have a number of other sensors 20 including, for example, a compass to provide orientation data and an inertial measurement unit (IMU) to provide specific force and angular rate data for the mobile robot 10. The robot 10 includes one or more motors 22 connected to a drive system 24 for moving the robot 10 in accordance with control signals from the controller 14. The drive system 24 may comprise any suitable drive system for a mobile robot such as, for example, a set of wheels, a set of rollers, a set of continuous tracks, or a set of legs.

Figure 2:
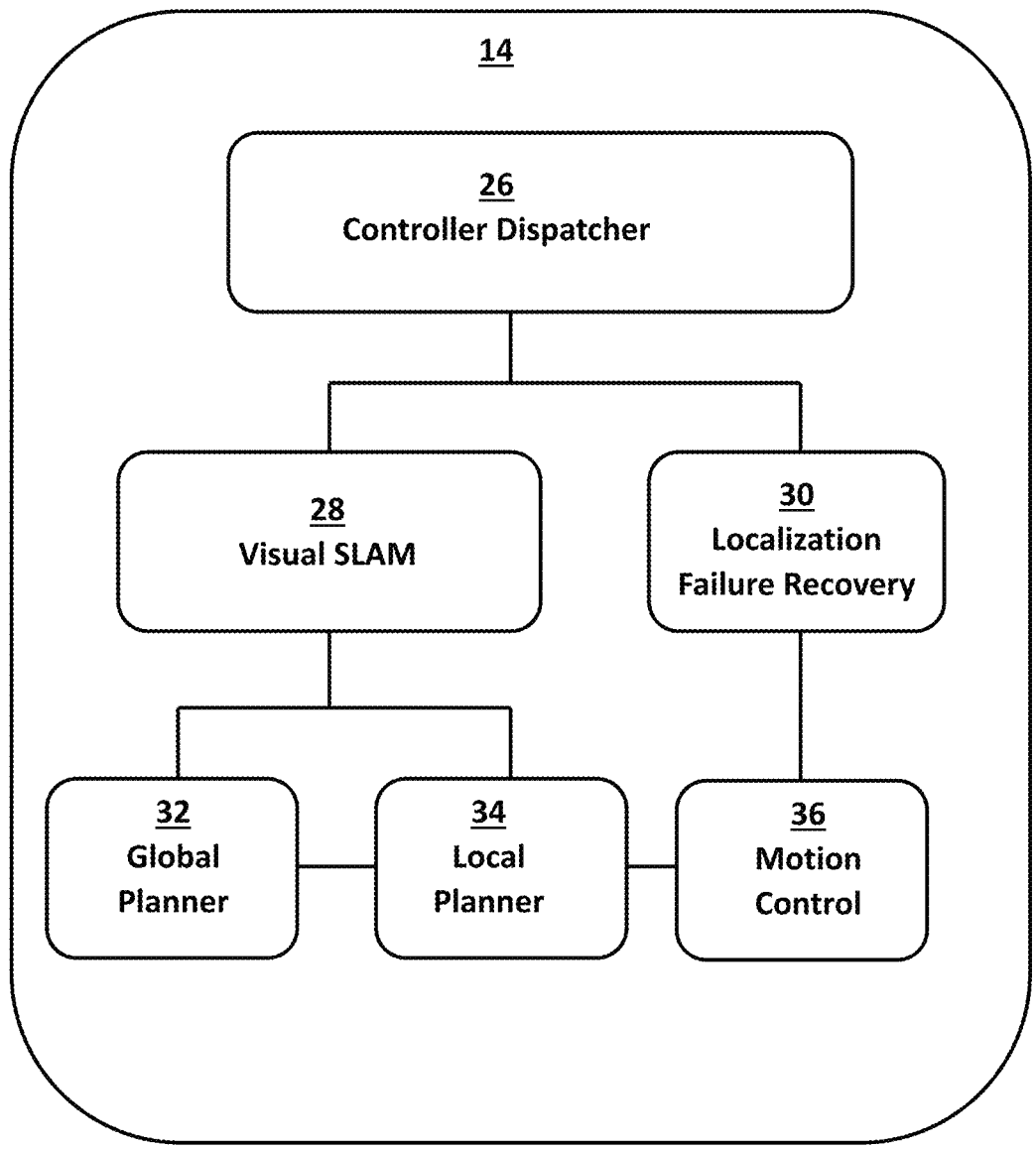
FIG. 2 is a schematic block diagram of software components comprising a controller of the mobile robot in accordance with the invention.

FIG. 2 is a schematic block diagram of the software components comprising the controller 14 for the mobile robot 10 in accordance with the invention. The controller 14 comprises a controller dispatcher 26. The controller dispatcher 26 may comprise a finite state machine (FSM) or a behavior tree. One function of the controller dispatcher 26 is to invoke a localization failure recovery software component 30 when the mobile robot 10 suffers a localization failure. The localization failure recovery software component 30 functions in accordance with the present invention as hereinafter described. Otherwise, the controller dispatcher 26 controls the mobile robot 10 through the visual SLAM software component 28. A global planner software component 32 is provided to determine a path from a starting location of the mobile robot 10 to a desired location in the map of the local environment. A local planner software component 34 is provided to avoid local obstacles in the path taken by the mobile robot and to keep the mobile robot 10 close to the determined global path. A motion control software component 36 provides motion control signals to the drive system 24 to drive the mobile robot 10 along the path between the starting location and the desired location.

As can be seen, the controller 14 comprises a plurality of software components or functional blocks for performing various functions for controlling the mobile robot 10 including motion of the mobile robot 10 along a path close to the determined global path. The plurality of software components or functional blocks comprising the controller 14 are preferably implemented through the machine-readable instructions stored in the memory 12 which are executed, in use, by the controller 14. The machine-readable instructions may be stored in one or more memories 12 (e.g., random access memory (RAM), read only memory (ROM), flash memory, magnetic memory, optical memory or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 12 may comprise processor-readable memories for use with respect to one or more processors 14 comprising the controller 14 operable to execute the machine-readable instructions. The controller 14 may comprise one or more special purpose processors (e.g., application specific integrated circuit (ASIC), field programmable gate array (FPGA), graphics processing unit (GPU).

The invention relates particularly to a mobile robot 10 equipped with a monovision camera 16 and having a localization failure recovery software component 30 comprising one or more algorithms to enable the mobile robot 10 to continue to move when a localization failure event is identified in the operation of the visual SLAM software component 28. The method of the invention may comprise a heuristic robot navigation method designed for indoor environments which are physically constrained in terms of passable areas, although it will be understood that the method of the invention may be applied to mobile robots in any environments which are physically constrained in terms of passable areas. The method of the invention is especially adapted for ground detection based on image segmentation with "Mean Shift" segmentation or other suitable image segmentation methods. "Mean Shift" segmentation comprises a local homogenization technique that can usefully be used to damp or shade tonality differences in images of localized objects. The method of the invention is configured such as to control the mobile robot 10 along a most likely passable path without localization, i.e., in the event of a localization failure, while avoiding both static and dynamic obstacles. By 'dynamic obstacles' is meant obstacles that change their positions by themselves or by other means.

The preferred method of controlling the mobile robot 10 in accordance with the invention comprises receiving an image from the camera 16, splitting the received image into at least two vertical portions, determining if one of said at least two vertical portions is indicative of a passable path, and controlling the mobile robot 10 to travel along the passable path indicated by a selected one of said at least two vertical portions determined to indicate a passable path. The method is preferably invoked when the mobile robot 10 has lost localization, i.e., in the event of a localization failure.

In some embodiments, the method includes continuously attempting to recover localization whilst controlling the mobile robot to travel along the passable path in accordance with the preferred method.

In some embodiments, the method includes periodically attempting to recover localization whilst controlling the mobile robot to travel along the passable path in accordance with the preferred method.

Once localization is recovered, the localization failure recovery is preferably terminated and control of motion of the mobile robot 10 is returned to the visual SLAM software component 28.

It is preferred that the image received from the camera 16 is an image taken in a direction of travel of the mobile robot 10 at the occurrence of the localization failure.

It is preferred that the received image is split into at least two vertical portions of equal width, preferably comprising a left-side vertical image portion and a right-side vertical image portion. The passable path may be selected by determining which of the left-side vertical image portion and the right-side vertical image portion is indicative of a passable path. In the event that each of the left-side vertical image portion and the right-side vertical image portion is determined to indicate a respective passable path, the method preferably comprises controlling the mobile robot 10 to travel along a preferred one of said respective passable paths.

It is preferred that the received image is converted into a binary image comprising two colors where pixels of one of the two colors are indicative of a floor or surface along which the mobile robot 10 is travelling and where pixels of the other of the two colors are indicative of a background environment at the location of the mobile robot 10. The pixels indicative of the floor or the surface along which the mobile robot 10 is travelling represent one or more possible passable paths. Preferably, at least a lower portion of the binary image is split into the at least two vertical portions. Then, a determination is made of a preferred passable path comprising one of said at least two vertical portions having the greatest number of pixels of the color indicative of the floor or the surface along which the mobile robot 10 is travelling.

Figure 3:
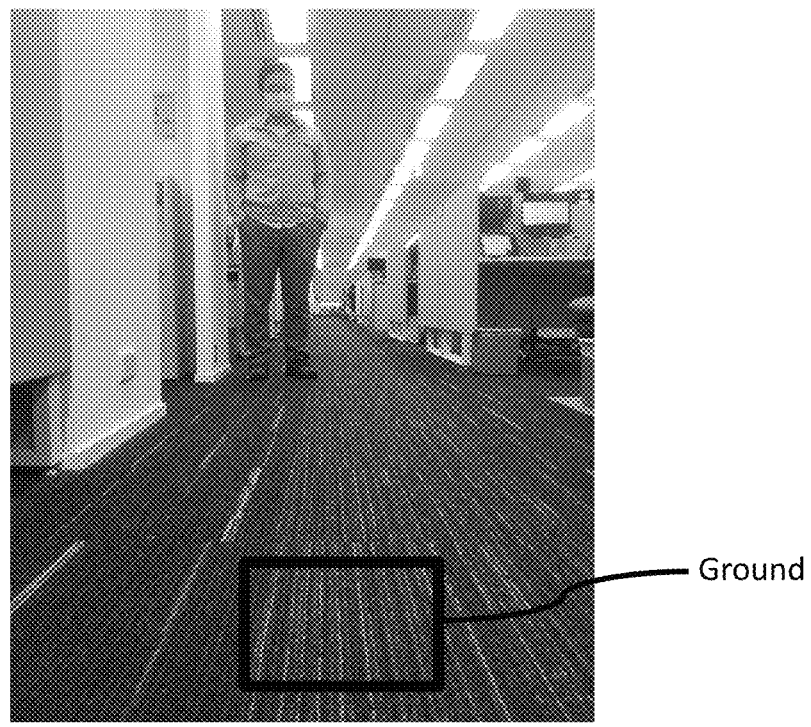
FIG. 3 provides a photographic image (originally in color) taken by the camera of the mobile robot in a forward direction of travel at the time a localization failure occurred.

Reference is made here to FIG. 3 which is a photographic image (originally in color) taken by the camera 16 of the mobile robot 10 in a forward direction of travel at the time a localization failure occurred. For ease of reference, the photographic image is tagged with a rectangular box to highlight part of the ground, namely the floor or the surface along which the mobile robot 10 is travelling. It can be seen also that a dynamic obstacle comprising a human being is located towards the left-side of the image and is blocking the view of part of the floor in a forward direction of motion of the mobile robot 10.

Figure 4:
FIG. 4 shows the same photographic image as FIG. 3 but segmented to damp or shade tonality differences in images of localized objects.

In contrast to FIG. 3, FIG. 4 shows the same photographic image but segmented to damp or shade tonality differences in images of localized objects. The segmentation in this instance uses the "Mean Shift" segmentation method. The "Mean Shift" segmentation method and similar such other image segmentation methods enable a portion of the image representing the ground or floor to be delineated or extracted. The "Mean Shift" segmentation method was first proposed in [1] Fukunaga, Keinosuke; Larry D. Hostetler. "The Estimation of the Gradient of a Density Function, with Applications in Pattern Recognition". IEEE Transactions on Information Theory. 21 (1): 32-40, January 1975. A modern version of the "Mean Shift" segmentation method is disclosed in [2] D. Comanicu, P. Meer: "Mean shift: A robust approach toward feature space analysis". IEEE Transactions on Pattern Analysis and Machine Intelligence, vol. 24, no. 5, May 2002. Either of disclosures [1] or [2] can be used in the method of the invention. Furthermore, as the method of the invention is focused on delineating or extracting from the photographic image the ground or floor on which the mobile robot 10 is travelling, this factor can be used to accelerate the "Mean Shift" segmentation method as the method of the invention requires only to separate the ground/floor from non-ground/floor objects. Such an acceleration of the "Mean Shift" segmentation method can be found in [3] André M. Santana, Kelson R. T. Aires, Rodrigo M. S. Veras, Adelardo A. D. Medeiros, "An Approach for 2D Visual Occupancy Grid Map Using Monocular Vision", Electronic Notes in Theoretical Computer Science, vol. 281: 175-191, 2011.

Figure 5:
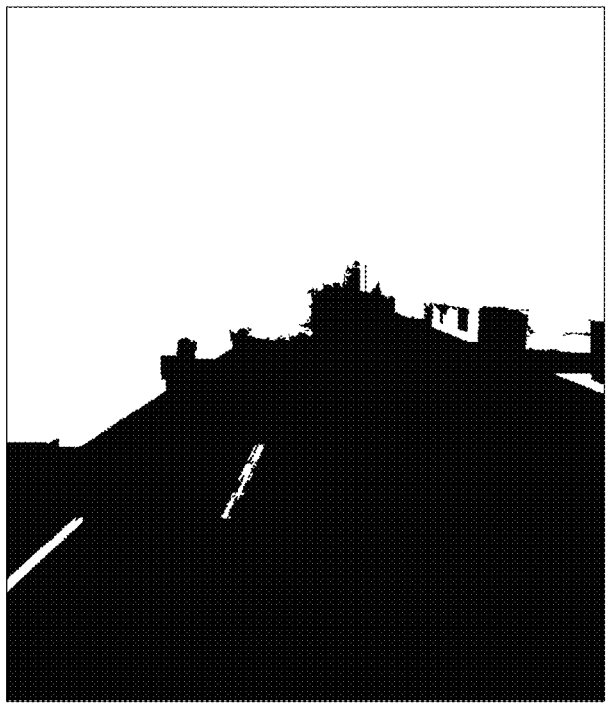
FIG. 5 shows the same photographic image as FIGS. 3-4 after segmentation and after the image has been converted to a binary image.

FIG. 5 shows the same photographic image after segmentation and after the image has been converted to a binary image. The preferred binary colors used are "black" for the ground or floor and "white" for the non-ground objects. It will be appreciated, however, that any two contrasting colors could be used in converting the segmented image of FIG. 4 to the binary image of FIG. 5. Consequently, in the preferred embodiment, black pixels of the binary image are indicative of the floor or the surface along which the mobile robot 10 is travelling.

Figure 6:
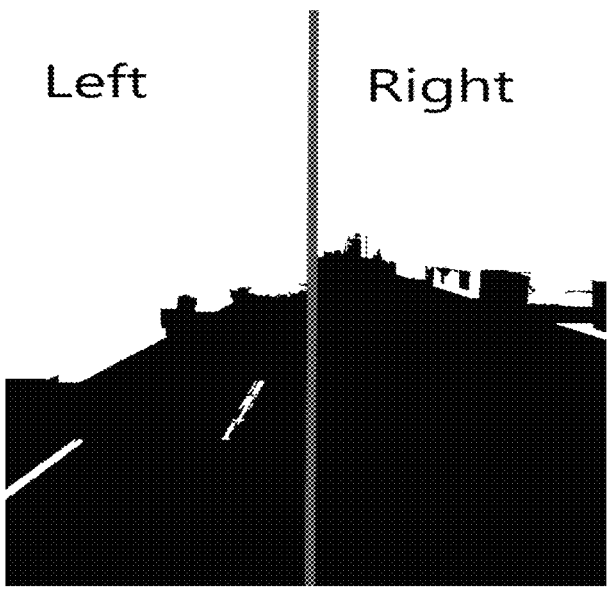
FIG. 6 shows the same photographic image as FIGS. 3-5 split into two equal width vertical parts.

In FIG. 6, the binary greyscale image of FIG. 5 is preferably split into two equal width vertical parts comprising a left-side vertical part or portion and a right-side vertical part or portion. It can be seen in FIG. 6 that the right-side vertical part of the binary greyscale image has a greater number of black pixels. Consequently, the right-side vertical part of the image is indicative of a more passable path along the ground or floor.

If P is taken as the total number of pixels in the binary greyscale image of FIG. 6 then $P_S$ can be considered as the total number of pixels of the passable area, $P_S$ comprising the total number of pixels of the black part of the image. In this example, the total number of pixels P is given by 600 pixels width by 800 pixels height=480,000 pixels. The total number of pixels of the passable area $P_S$=231, 151. The split in the number of passable area pixels between the left-side part of the image and the right-side part of the image can be denoted as $P_L$ and $P_R$ respectively. In this example, $P_L$=102, 671 pixels whereas $P_R$=128, 480 pixels. Consequently, $P_R > P_L$. In the method of the invention, the right-side of the image in this example is indicative of a preferred passable path for the mobile robot 10. It is not essential that the whole photographic image is converted to a binary image. It is only necessary that the lower portion of the image encompassing all of the segmented floor part of the image is extracted and then split into at least two vertical portions of equal width. However, in practice it may be just as efficient to convert the whole segmented image into the binary image in view of the low computational complexity of processing the photographic image as discussed with respect to FIGS. 3 to 6.

In preferred embodiments, a virtual robot is provided as a reference robot for the mobile robot 10. The virtual robot is controlled to travel virtually along the global path based on sensor inputs from the sensors 20 of the mobile robot 10.

Figure 7:
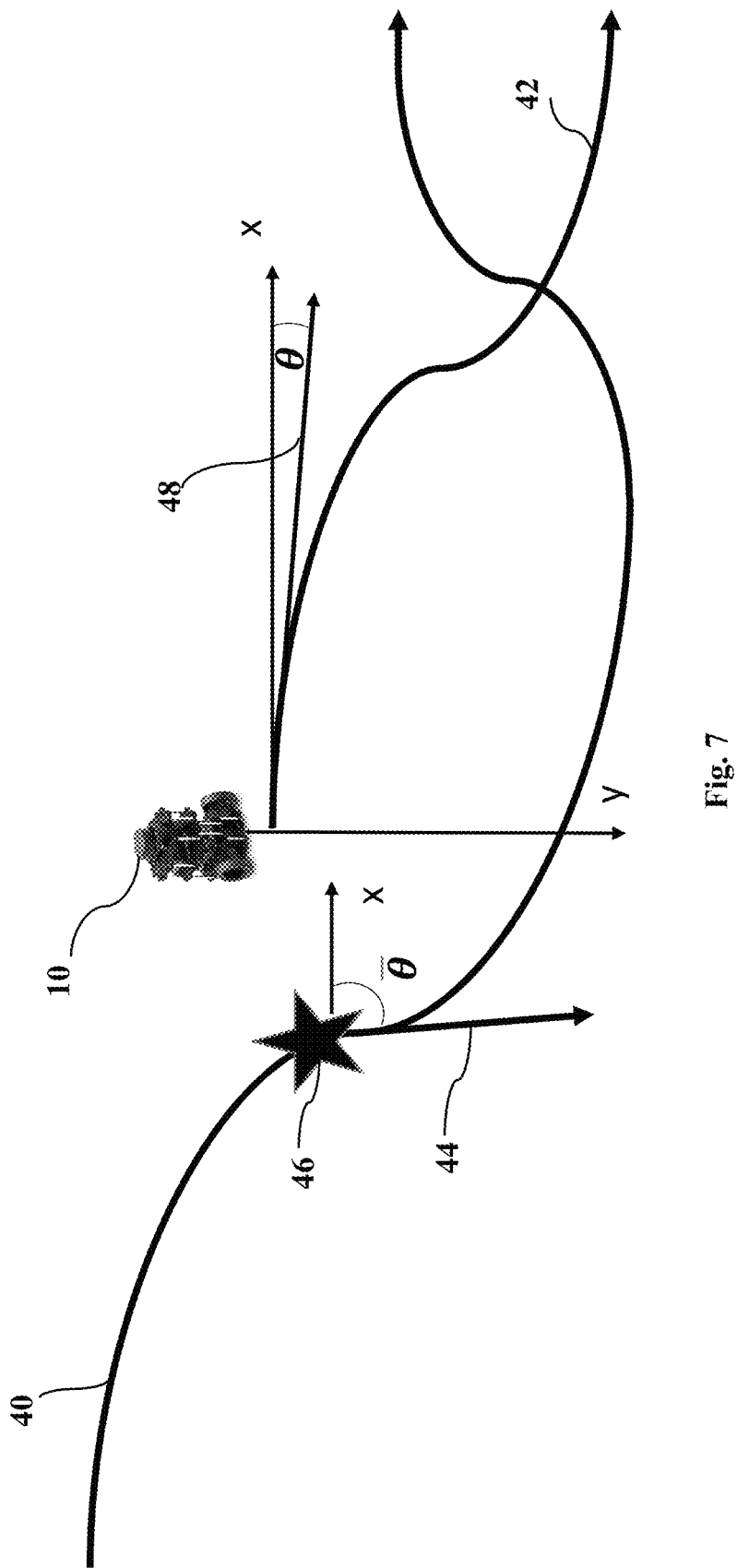
FIG. 7 compares the global path taken by the virtual robot to the actual path taken by the mobile robot.

Reference is made to FIG. 7 which compares the global path 40 taken by the virtual robot to the actual path 42 taken by the mobile robot 10. It will be appreciated that the actual path 42 taken by the mobile robot 10 may deviate from the global path 40 in response to control inputs from the local planner software component 34 which controls the mobile robot 10 to avoid local obstacles in the actual path 42 taken by the mobile robot 10 whilst attempting to keep the mobile robot 10 close to the determined global path 40. Arrowed line 44 indicates the direction of movement of the virtual robot with respect to the global path 40 at a point in time and at a location along the global path 40 where, as indicated by the star device 46, the mobile robot 10 suffers a localization failure on the actual path 42. The angle $\bar{\theta}$ indicates the orientation of the virtual robot to the global path 40 at the location of the star device 42, i.e., on occurrence of the localization failure. Arrowed line 48 indicates the direction of movement of the mobile robot 10 with respect to the actual path 42 on occurrence of the localization failure and angle $\theta$ indicates the orientation of the mobile robot 10 with respect to the actual path 42 on occurrence of the localization failure.

Figure 8:
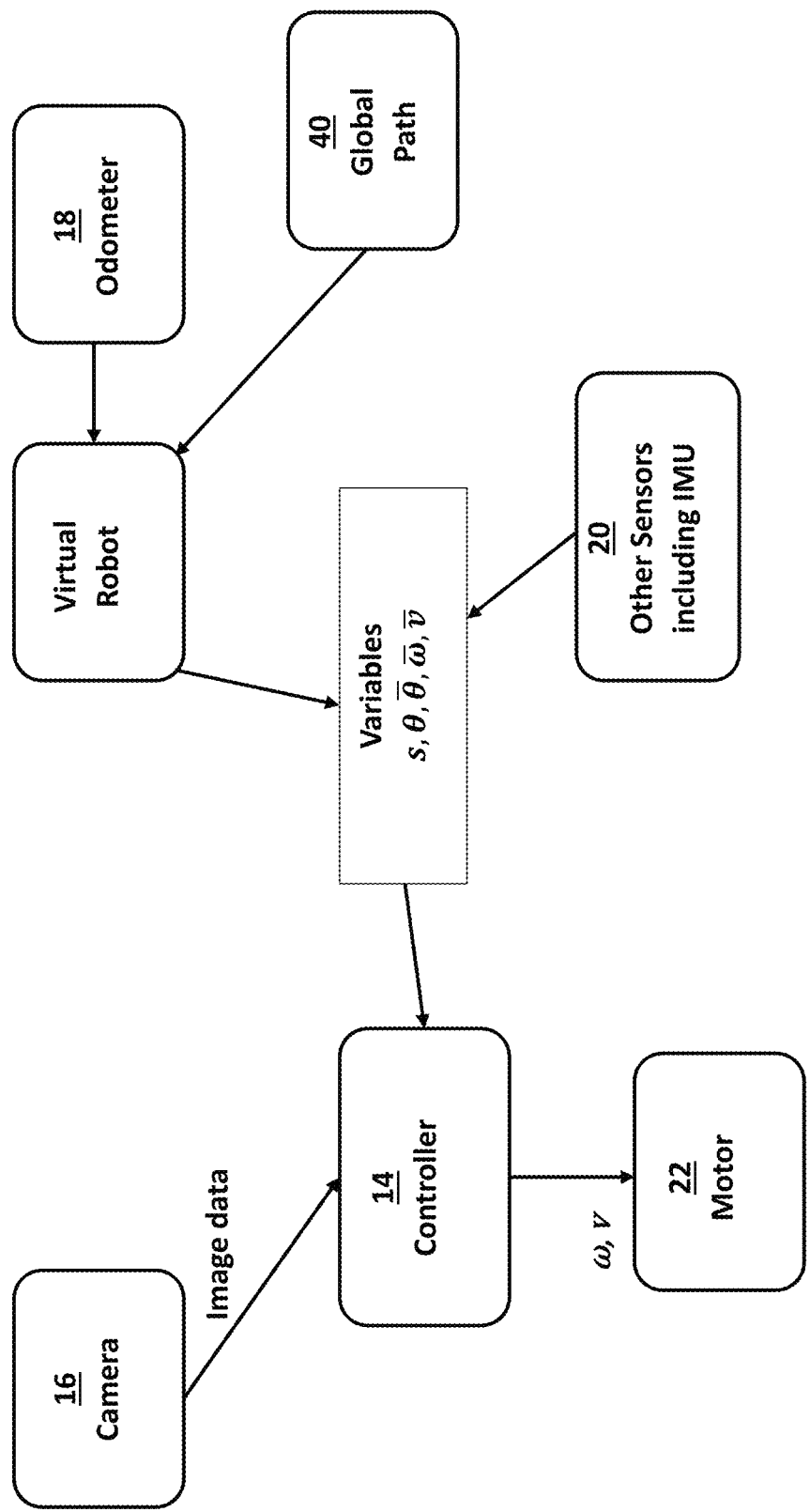
FIG. 8 illustrates the derivation of the control variables used in control of motion of the mobile robot.

FIG. 8 illustrates the derivation of the control variables $\omega$, $v$ used to control motion of the mobile robot 10 where $\bar{\omega}$ is the desired angular velocity of the mobile robot 10 and $\bar{v}$ is the desired straight-line speed of the mobile robot 10. The camera 16 provides image data to the controller 14. The variables s, $\theta$, $\bar{\theta}$, $\bar{\omega}$, $\bar{v}$ are derived from the other sensors 20 including the IMU, the odometer 18 and the virtual robot's distance travelled along the global path 40 and its orientation with respect to the global path 40 when the localization failure occurs.

On occurrence of the localization failure, the virtual robot will be at the nearest point 46 on the global path 40 to a location of the mobile robot 10 on the actual path 42. After occurrence of the localization failure, the virtual robot is controlled to travel along the global path 40 by a distance equal to a distance travelled by the mobile robot 10 along a selected passable path which now constitutes the actual path 42.

In FIG. 8:
s denotes a path length of the global path 40. When a new localization failure phase commences, s is set to zero. The time t is also set to zero. On occurrence of the new localization failure, the pose of the virtual robot is determined at the nearest point 46 on the global path 40 where s=0. Variable s saturates at the end of the global path.

$\theta$ denotes the orientation of the mobile robot 10 with respect to the actual path 42 on the occurrence of the new localization failure.

$\bar{\theta}$ denotes the orientation of the virtual robot with respect to the global path 40 on the occurrence of the new localization failure.

$\bar{\omega}$, $\bar{v}$ are respectively the angular velocity of the mobile robot (10) and the straight-line speed of the mobile robot (10) on the actual path 42.

Figure 9:
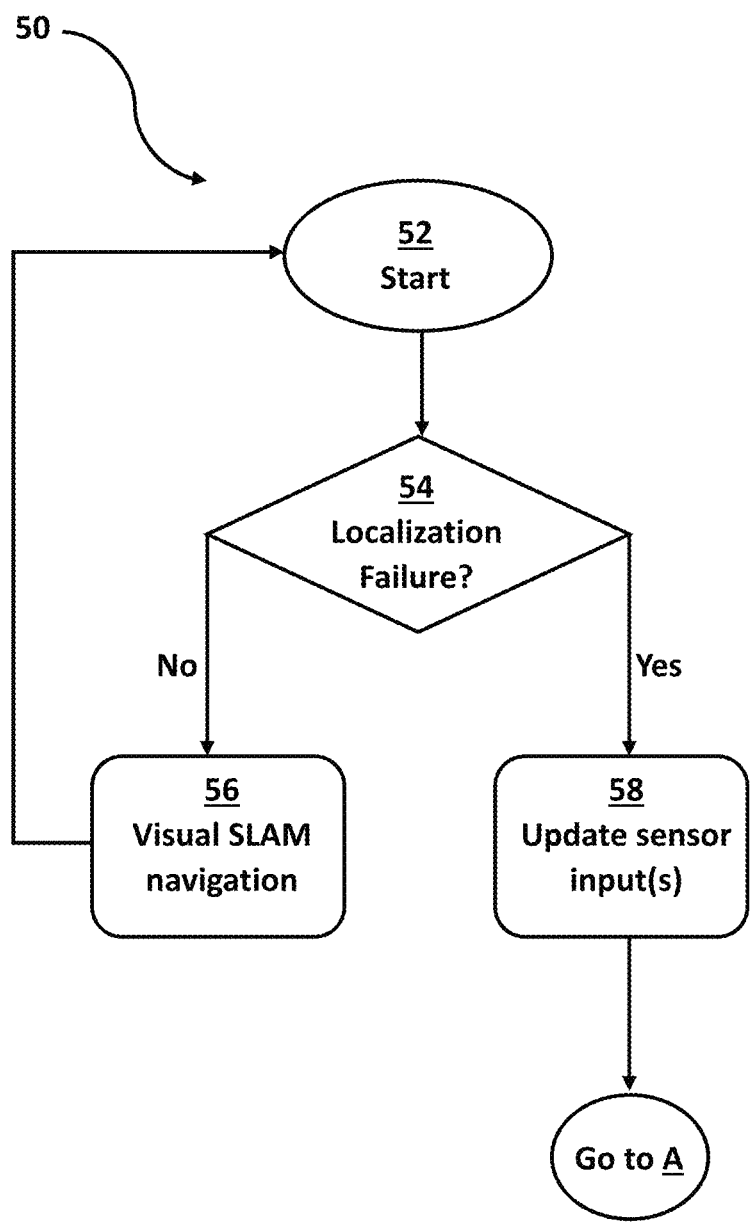
FIG. 9 schematically illustrates a first part of the method in accordance with the invention.

FIG. 9 schematically illustrates a first part of the method 50 in accordance with the invention. The method 50 commences at start 52 and, at decision box 54, determines if a (new) localization event has occurred. If no, then the method 50 continues at step 56 with normal control of motion of the mobile robot 10 under visual SLAM navigation. The method 50 may include periodically returning to start 52 to recheck at decision box 54 if a localization failure has occurred and/or may return to start 52 when triggered by a detection by the controller 14 of a new localization failure event. However, if yes at decision box 54, the method 50 continues at step 58 by updating the mobile robot sensor inputs including obtaining or receiving at least one image from the camera 16. The image data from the camera 16 is processed as hereinbefore described with respect to FIGS. 3-6.

Figure 10:
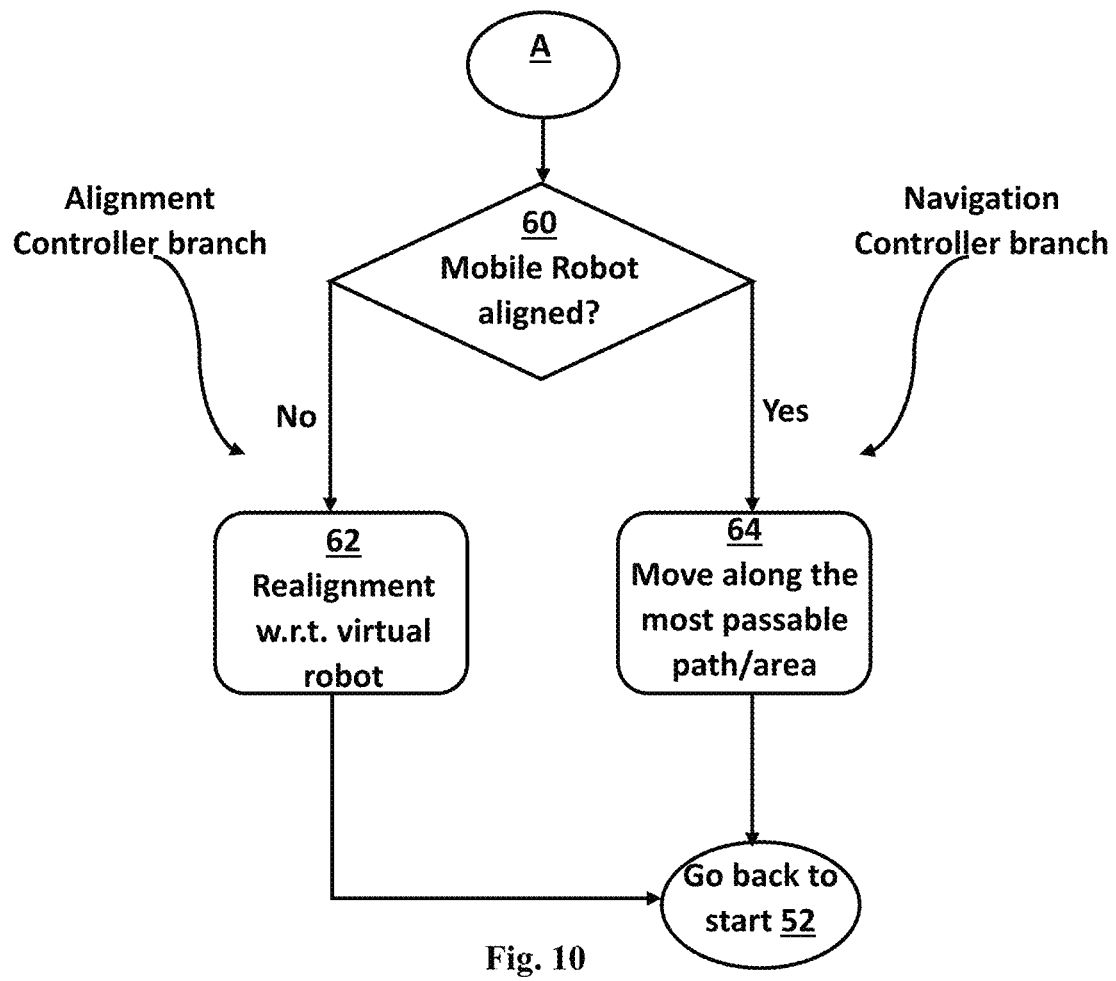
FIG. 10 shows further steps of the method in accordance with the invention.

Further steps of the method 50 following step 58 are schematically illustrated by FIG. 10. Once the mobile robot sensor inputs have been updated at step 58, a determination is made at decision box 60 as to whether or not the mobile robot 10 is in alignment with the virtual robot. Alignment may be determined from the equation $|\bar{\theta}(s)-\theta(s)|\cong 0$, i.e., where the difference between the orientation $\theta$ of the mobile robot 10 with respect to the actual path 42 and the orientation $\bar{\theta}$ of the virtual robot with respect to the global path 40 on the occurrence of the localization failure is equal or almost zero and where s in this instance is the length of mobile robot 10 has travelled since t=0, t being the current physical time. If no, the method 50 continues at step 62 to realign the mobile robot 10 with respect to the orientation of the virtual robot. Step 62 comprises an alignment controller branch of the method 50 as will be explained hereinafter. If yes, the mobile robot 10 is controlled to move along the most passable area or path, i.e., the preferred passable path, determined from the processing of the image data from the camera 16. Step 64 comprises a navigation controller branch of the method 50 as will be explained hereinafter. Following one or both of steps 62 and 64, the method 50 returns to start 52 and a new determination is made at decision box 54 of whether or not a localization failure has occurred or still exists.

Figure 11:
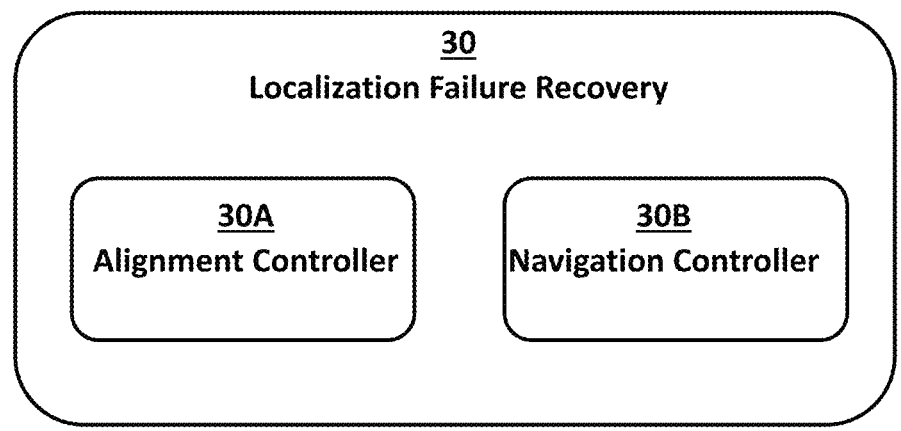
FIG. 11 schematically illustrates that the localization failure recovery software component comprises an alignment controller and a navigation controller.

FIG. 11 schematically illustrates that the localization failure recovery software component 30 preferably comprises an alignment controller 30A and a navigation controller 30B. It will be understood that each of the alignment controller 30A and the navigation controller 30B are also preferably implemented as software components of the controller 14.

Figure 12:
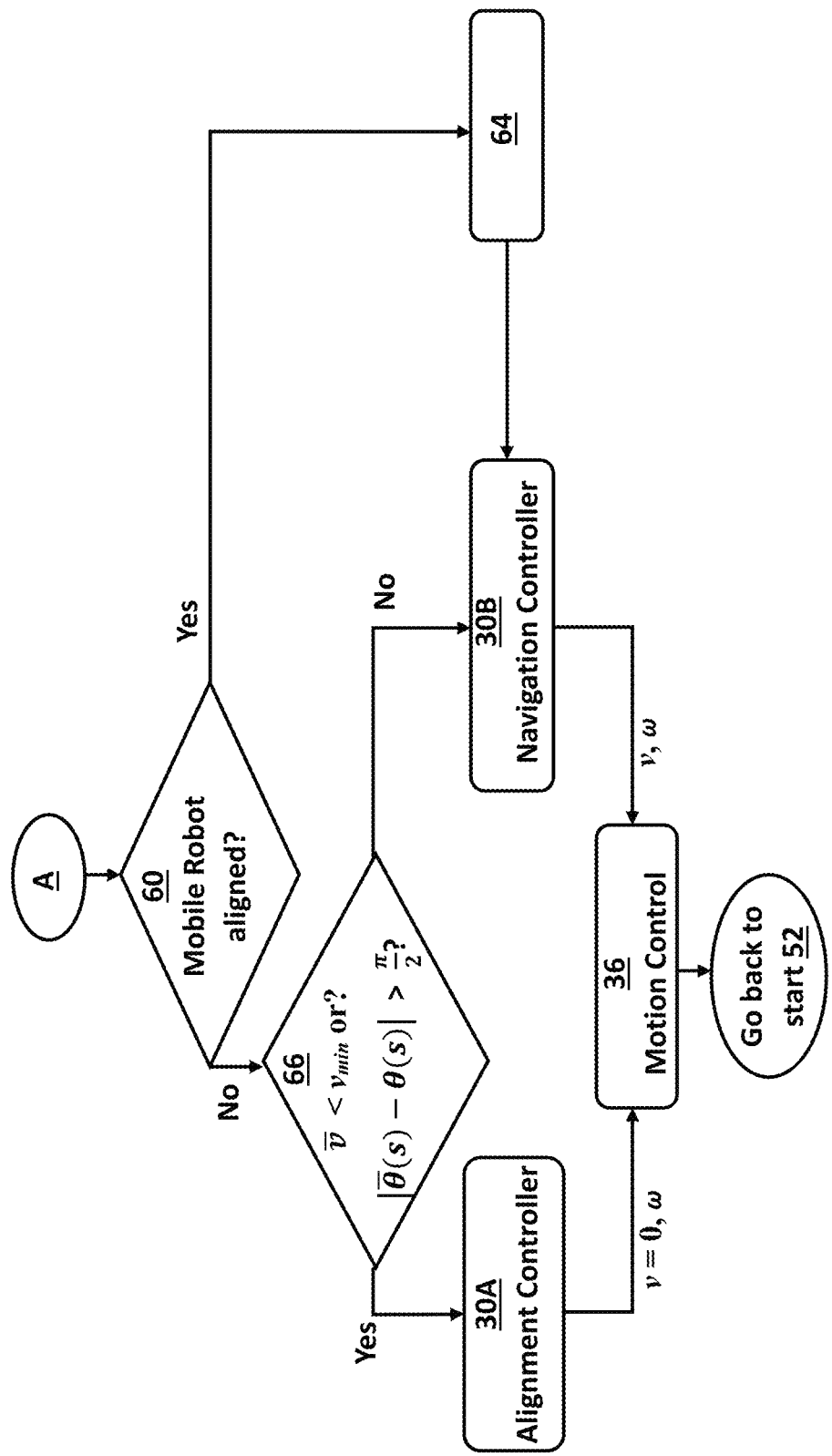
FIG. 12 schematically illustrates the function of the alignment controller.

FIG. 12 schematically illustrates in more detail some of the steps of the method 50 and, more specifically, the function of the alignment controller 30A. If at decision box 60 it is determined that the mobile robot 10 is not aligned with the virtual robot, i.e., $|\bar{\theta}(s)-\theta(s)|$ is not equal or close to zero, then, at decision box 66, a determination is made by the controller despatcher software component 26 of the controller 14 whether to invoke the alignment controller 30A to realign, as in step 62 (FIG. 10), the mobile robot 10 with respect to the virtual robot or to invoke the navigation controller 30B to, as in step 64 (FIG. 10), try and move the mobile robot 10 along the most passable path/area. The determination at box 66 will be "Yes" if either one of two conditions are determined to be present, the two conditions comprising (i) a determination that the speed of the mobile robot 10 is below a minimum predetermined threshold speed ($\bar{v} < v_{min}$) or (ii) the orientation of the mobile robot 10 with respect to the virtual robot is 90° or more $$\left( |\bar{\theta}(s) - \theta(s)| > \frac{\pi}{2} \right).$$

If neither of the two conditions (i) and (ii) is determined to be present, then the determination at box 66 will be "No" leading to step 64 whereby the controller dispatcher software component 26 invokes the navigation controller 30B to try and move the mobile robot 10 along the most passable path/area. In the case of a "Yes" determination at decision box 66, the alignment controller 30A will issue control signals v, ω to cause the straight-line speed $\bar{v}$ of the mobile robot 10 to be zero and to control the angular velocity $\bar{\omega}$ of the mobile robot 10 such as to align the mobile robot 10 with the virtual robot. In the case of a "No" determination at decision box 66, the navigation controller 30B will issue control signals v, ω to control the straight-line speed $\bar{v}$ and the angular velocity $\bar{\omega}$ of the mobile robot 10 to move the mobile robot 10 along the most passable path/area.

In some embodiments, the alignment controller 30A comprises a proportional controller with saturation. Saturation comprises a pre-specified or predetermined angular velocity value which prevents the mobile robot 10 spinning too quickly. As described above, when the alignment controller 30A is invoked, it controls the mobile robot 10 to have a straight-line speed $\bar{v}=0$, i.e., the mobile robot is brought to a stop in a direction of movement. The alignment controller 30A controls the angular velocity $\bar{\omega}$ of the mobile robot 10 such as to align the mobile robot 10 with the virtual robot 25 and preferably does so according to:

ω=clamp($k_1(\bar{\theta}(s)-\theta(s)),-\omega_{max},\omega_{max}$) where: $k_1$ is an adjustable control parameter;

$\omega_{max}$ is the (positive) saturation value of the angular speed control variable;

θ is the orientation of the mobile robot 10 with respect to the actual path 42;

$\bar{\theta}(s)$ is the orientation of the virtual robot with respect to the global path 40, where variable s saturates at the end of the global path 40; and (ω, v) are control outputs for the mobile robot 10.

The alignment controller 30A aligns the mobile robot 10 with respect to the virtual robot such that the angular velocity $\bar{\omega}$ (spin) of the mobile robot 10 is greater when the difference between the orientation θ of the mobile robot 10 and the orientation $\bar{\theta}$ of the virtual robot is larger. The proportional controller multiplies the difference between the orientation of the virtual robot and the orientation of the mobile robot 10 by a constant factor, preferably a constant positive factor.

It can be seen therefore that orientation of the virtual robot on the global path 40 is used as an input to the alignment controller 30A to control alignment of the mobile robot 10 on the selected passable path. It can also be seen that the alignment controller 30A is invoked if the mobile robot's straight-line speed $\bar{v}$ is lower than a predetermined, selected or calculated threshold speed value $v_{min}$ and/or when the alignment of the mobile robot 10 with respect to the virtual robot is at or greater than 90°.

Figure 13:
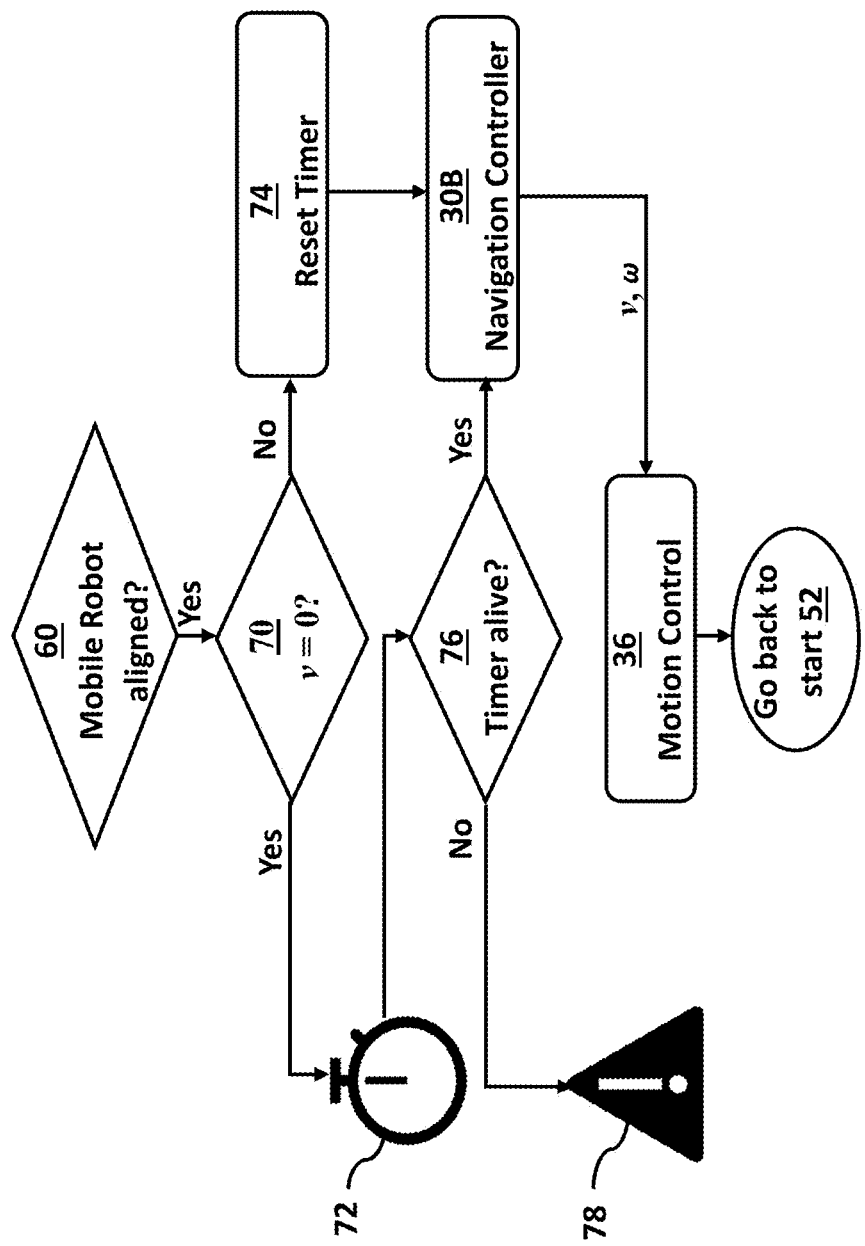
FIG. 13 schematically illustrates the function of the navigation controller.

FIG. 13 schematically illustrates in more detail some of the steps of the method 50 and, more specifically, the function of the navigation controller 30B. Assuming that, at decision box it is determined that the mobile robot 10 is aligned with the virtual robot then the despatcher software component 26 of the controller 14 will invoke the navigation controller 30B to try and cause the mobile robot 10 to move along the preferred path.

Where the alignment controller 30A has aligned the mobile robot 10 with respect to the virtual robot and prior to invoking the navigation controller 30B, a determination is made at decision box 70 whether or not the straight-line speed $\bar{v}$ of the mobile robot 10 equals zero. If the determination as decision box 70 is "Yes" then a timer 72 is started. The timer 72 is reset every time the alignment controller 30A has realigned the mobile robot 10 with the virtual robot and it is determined at decision box 70 that the straight-line speed $\bar{v}$ of the mobile robot 10 equals zero. If, however, the determination as decision box 70 is "No" then the timer 72 is reset at step 74 and the navigation controller 30B is invoked to control movement of the mobile robot along the preferred passable path.

If, having started the timer 72 after the determination at decision box 70 is "yes", it is determined at decision box 76 that the timer is alive then the navigation controller 30B is invoked to control movement of the mobile robot 10 along the preferred passable path. In this context "timer alive" means that an elapsed time period since the mobile robot 10 stopped moving, i.e., the elapsed time period since straight-line speed $\bar{v}$ of the mobile robot 10 became zero, exceeds a predetermined time period. If, having started the timer 72 after the determination at decision box 70 is "yes", it is determined at decision box 76 that the timer is not alive then an error condition 78 is returned.

Figure 14:
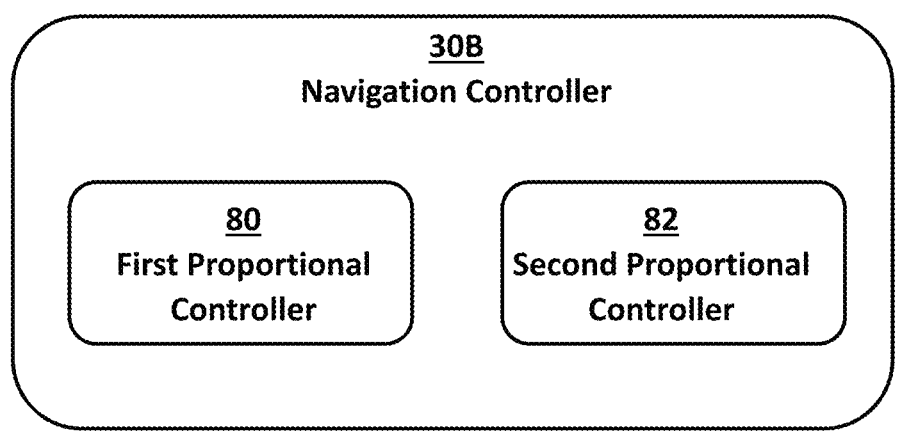
FIG. 14 illustrates that the navigation controller comprises two proportional controllers.

As shown in FIG. 14, in some embodiments, the navigation controller 30B comprises two proportional controllers, a first proportional controller 80 to control the straight-line speed $\bar{v}$ of the mobile robot 10 and a second proportional controller 82 to control the angular velocity or spin speed $\bar{\omega}$ of the mobile robot 10. The first proportional controller 80 is preferably controlled according to:

$$v = \min\left(k_2\left(\frac{P_S}{P} - c\right), v_{max}\right)$$

and the second proportional controller 82 is preferably controlled according to:

$$\omega = \text{clamp}\left(k_3\frac{P_L - P_R}{P_S}, -\omega_{max}, \omega_{max}\right)$$

where $k_2$, $k_3$ are adjustable control parameters;

c>0 is a constant tunable by the user;

$v_{max}$ is the (positive) saturation value for angular speed control of the mobile robot 10;

P is the total number of pixels in the received image;

$P_S$ is the total number of pixels of the (preferred) passable path/area;

$P_L$ is the number of pixels of the passable area in the left vertical part of the received image;

$P_R$ is the number of pixels of the passable area in the right vertical part of the received image; and $\omega_{max}$ is the (positive) saturation value for the angular speed control of the mobile robot 10.

A larger value of P s results in faster straight-line speed control v of the mobile robot 10. In practice, a larger passable path or passable area leads to greater straight-line speed control v of the mobile robot 10. A larger passable path or passable area to the right or left results in the mobile robot 10 being controlled to turn to the right or left, respectively. The control value of ω is determined or selected to turn the mobile robot 10 towards the less restricted direction in the passable path or area.

The various control parameters may be tuned to improve control of motion of the mobile robot 10. In some embodiments, tuning of the control parameters may comprise the following:

first, determine the shift factor c by making sure the mobile robot 10 stops before it hits a wall with properly set values of other parameters. The shift factor c may be determined using a fixed value of $v_{max}$;

second, determine the proportional parameter $k_3$ of the angular speed control of the navigation controller 30B by making sure the mobile robot 10 can avoid dynamic obstacles such as walking human beings in open areas with properly set values of other parameters. This may be determined using a fixed value of $v=0.5*v_{max}$ and a fixed value of $\omega_{max}$;

third, determine the proportional parameter $k_2$ of the speed control of the navigation controller 30B by making sure the mobile robot 10 can avoid dynamic obstacles such as walking human beings in physically constrained areas which are typical in office environments. This may be determined using a fixed value of $v_{max}$ and a fixed value of $\omega_{max}$;

fourth, determine the proportional parameter $k_1$ of the alignment controller 30A which controls how fast the mobile robot 10 spins when performing an orientation alignment, making sure it is not too fast. This may be determined using a value of $v=0$ and a fixed value of $\omega_{max}$.

It can be seen therefore that, when the mobile robot 10 is aligned with the virtual robot, the navigation controller 30B controls both the straight-line speed $\bar{v}$ and angular speed $\bar{\omega}$ of the mobile robot 10 along the selected or preferred passable path. When, if the straight-line speed $\bar{v}$ of the mobile robot 10 is zero, the timer 72 is started and the navigation controller 30B is repeatedly invoked until the timer 72 expires and/or the mobile robot 10 is determined to be moving along the preferred passable path.

In some embodiments, the number of pixels of the image portion indicative of the determined preferred passable path normalized by the total number of pixels in the received image is used to control at least the initial straight-line speed $\bar{v}$ of the mobile robot 10 along the determined preferred passable path.

In some embodiments, a difference between the number of pixels indicative of a passable path in the left-side vertical portion with the number of pixels indicative of a passable path in the right-side vertical portion is used to control at least the initial angular speed $\bar{\omega}$ of the mobile robot 10 along the determined preferred passable path.

The invention also provides a mobile robot comprising a memory storing machine-readable instructions and a controller for executing the machine-readable instructions such that, when the controller executes the machine-readable instructions, it configures the mobile robot to implement the steps of the method in accordance with the invention.

The invention also provides a non-transitory computer-readable medium storing ma-chine-readable instructions, wherein, when the machine-readable instructions are executed by a processor or a controller 14, they configure the processor or controller 14 to implement the afore-described method in accordance with the invention.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of controlling movement of a mobile robot in the event of a localization failure, the method comprising:
   on an occurrence of the localization failure, receiving an image from an image sensor of the mobile robot;
   converting the received image into a binary image comprising two colors where pixels of one of the two colors are indicative of a floor or surface along which the mobile robot is travelling and where pixels of the other of the two colors are indicative of a background environment, the pixels indicative of the floor or the surface along which the mobile robot is travelling representing one or more possible passable paths;
   splitting at least a lower portion of the binary image into at least two vertical portions;
   determining if one of said at least two vertical portions is indicative of a passable path by determining a preferred passable path as comprising one of said at least two vertical portions of at least the lower portion of the binary image having the greatest number of pixels of the color indicative of the floor or the surface along which the mobile robot is travelling; and controlling the mobile robot to travel along the preferred passable path.

2. The method of claim 1, wherein the method includes continuously or periodically attempting to recover localization whilst controlling the mobile robot to travel along the preferred passable path.

3. The method of claim 1, wherein the method comprises continuously or periodically receiving further images from the image sensor of the mobile robot and repeating the steps of claim 1 for each received image.

4. The method of claim 1, wherein the image received from the image sensor is an image in a direction of travel of the mobile robot at the occurrence of the localization failure.

5. The method of claim 1, wherein the at least a lower portion of the binary image is split into at least two vertical portions of equal widths.

6. The method of claim 1, wherein the method comprises:
splitting the at least a lower portion of the binary image into a left-side vertical image portion and a right-side vertical image portion; and
determining which of the left-side vertical image portion and the right-side vertical image portion comprises the preferred passable path.

7. The method of claim 1, wherein, prior to splitting the at least a lower portion of the binary image into said at least two vertical portions, the received image is segmented to identify the lower portion of the received image indicative of the floor or the surface along which the mobile robot is travelling.

8. The method of claim 1, wherein the received image is converted to a binary greyscale image where the two colors comprise black and white and where the black pixels are indicative of the floor or the surface along which the mobile robot is travelling.

9. The method of claim 1, wherein the number of pixels of the vertical portion indicative of the preferred passable path normalized by a total number of the pixels in the received image is used to control at least an initial straight-line speed of the mobile robot along the preferred passable path.

10. The method of claim 1, wherein the method comprises splitting at least the lower portion of the binary image into a left-side vertical portion and a right-side vertical portion and using a difference between a number of pixels indicative of a passable path in the left-side vertical portion with a number of pixels indicative of a passable path in the right-side vertical portion to control at least an initial angular speed of the mobile robot along the determined preferred passable path.

11. The method of claim 1, wherein a global path is defined for the mobile robot and a virtual robot is provided as a reference robot for the mobile robot, the virtual robot being controlled to travel along the global path such that, on occurrence of the localization failure, the virtual robot is at a nearest point on the global path to a location of the mobile robot and, after occurrence of the localization failure, the virtual robot is controlled to travel along the global path by a distance equal to a distance travelled by the mobile robot along the preferred passable path.

12. The method of claim 11, wherein orientation of the virtual robot on the global path is used as an input to an alignment controller to control alignment of the mobile robot on the selected passable path.

13. The method of claim 12, wherein the alignment controller is invoked if the mobile robot's straight-line speed is lower than a predetermined, selected or calculated threshold speed value and/or when the alignment of the mobile robot with respect to the virtual robot is greater than 90°.

14. The method of claim 12, wherein, when the mobile robot is aligned with the virtual robot, a navigation controller controls both the straight-line speed and angular speed of the mobile robot along the preferred passable path.

15. The method of claim 14, when, if the straight-line speed of the mobile robot is zero, a timer is started, and the navigation controller is repeatedly invoked until the timer expires and/or the mobile robot is determined to be moving.

16. The method of claim 1, wherein a controller of the mobile robot comprises a global planner module configured to determine a global path based on a pre-constructed map of the mobile robot's operating environment, the global path being determined between a starting location of the mobile robot and a selected or desired stopping location, and a local planner module configured to assist the mobile robot in avoiding obstacles as the mobile robot travels along or close to the global path.

17. The method of claim 2, wherein, once localization is recovered, the steps of claim 1 are terminated.

18. A mobile robot comprising a memory storing machine-readable instructions and a controller for executing the machine-readable instructions such that, when the controller executes the machine-readable instructions, it configures the mobile robot to implement the steps of:
on an occurrence of the localization failure, receiving an image from an image sensor of the mobile robot;
converting the received image into a binary image comprising two colors where pixels of one of the two colors are indicative of a floor or surface along which the mobile robot is travelling and where pixels of the other of the two colors are indicative of a background environment, the pixels indicative of the floor or the surface along which the mobile robot is travelling representing one or more possible passable paths;
splitting at least a lower portion of the binary image into at least two vertical portions;
determining if one of said at least two vertical portions is indicative of a passable path by determining a preferred passable path as comprising one of said at least two vertical portions of at least the lower portion of the binary image having the greatest number of pixels of the color indicative of the floor or the surface along which the mobile robot is travelling; and
controlling the mobile robot to travel along the preferred passable.

* * * * *